United States Patent
Ishizaki

(10) Patent No.: US 10,902,632 B2
(45) Date of Patent: Jan. 26, 2021

(54) POSITION DETECTION APPARATUS AND POSITION DETECTION METHOD

(71) Applicant: KABUSHIKI KAISHA TOYOTA JIDOSHOKKI, Kariya (JP)

(72) Inventor: Masataka Ishizaki, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 16/587,382

(22) Filed: Sep. 30, 2019

(65) Prior Publication Data

US 2020/0111229 A1 Apr. 9, 2020

(30) Foreign Application Priority Data

Oct. 3, 2018 (JP) ................................. 2018-188291

(51) Int. Cl.
*G06T 7/73* (2017.01)
*H04N 13/204* (2018.01)
*B60Q 9/00* (2006.01)
*B60R 11/04* (2006.01)

(52) U.S. Cl.
CPC ............. *G06T 7/73* (2017.01); *H04N 13/204* (2018.05); *B60Q 9/008* (2013.01); *B60R 11/04* (2013.01); *B60R 2300/107* (2013.01); *B60R 2300/8066* (2013.01); *B60Y 2200/15* (2013.01); *G06T 2207/10012* (2013.01)

(58) Field of Classification Search
CPC ........... G06T 7/73; B60R 11/04; B60Q 9/008; H04N 13/204

USPC ............................................................ 348/49
See application file for complete search history.

(56) References Cited

U.S. PATENT DOCUMENTS

2012/0140039 A1* 6/2012 Ota ...................... B60W 30/12
348/46

FOREIGN PATENT DOCUMENTS

| JP | 2004-182100 A | 7/2004 |
| JP | 2015-217738 A | 12/2015 |
| JP | 2017-211791 A | 11/2017 |
| JP | 2018-013985 A | 1/2018 |

* cited by examiner

*Primary Examiner* — Jeffery A Williams
(74) *Attorney, Agent, or Firm* — Sughrue Mion, PLLC

(57) ABSTRACT

A parallax image in which a parallax is associated with each pixel is acquired from an image captured by a stereo camera. The parallax is voted to a two-dimensional matrix. A line is extracted from a coordinate system in which an X-axis indicates the parallax and a Y-axis indicates the pixel in the vertical direction. In the case where a first line and a second line are detected, an X-coordinate of the start point coordinates of the second line is larger than an X-coordinate of end point coordinates of the first line, and the difference between the slope of the first line and the slope of the second line falls within a permissible range, a determination section determines that a low position is present at a position farther from the movable body than a position in real space corresponding to a Y-coordinate of start point coordinates.

5 Claims, 8 Drawing Sheets

| Parallax<br>Vertical Pixel | 1 | 2 | 3 | ... | d |
|---|---|---|---|---|---|
| 1 | | | | | |
| 2 | | | | | |
| 3 | | | | | |
| . | | | | | |
| . | | | | | |
| . | | | | | |
| v | | | | | |

POSITION DETECTION APPARATUS AND POSITION DETECTION METHOD

BACKGROUND

1. Field

The present disclosure relates to a position detection apparatus and a position detection method.

2. Description of Related Art

In the case where a movable body is traveling in a place having a height difference, when the movable body moves to a low position that is a position lower than a road surface on which the movable body is traveling, there are cases where the movable body becomes unable to travel.

Japanese Laid-Open Patent Publication No. 2004-182100 describes an apparatus that prevents a forklift from falling from a road surface on a platform onto a flat surface under the platform. In the above document, a guide wire is disposed on the road surface on the platform, and a sensor for detecting the guide wire is disposed in the forklift. When the guide wire is detected by the sensor, the forklift is forced to stop.

In the above document, improvement of an infrastructure such as preliminary provision of the guide wire on the road surface for detection of a low position is necessary.

SUMMARY

An objective of the present disclosure is to provide a position detection apparatus and a position detection method capable of detecting a low position without improving an infrastructure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1

A position detection apparatus is mounted on a movable body and is configured to detect a low position that is a position lower than a road surface on which the movable body is present. The position detection apparatus includes a stereo camera, a parallax image acquisition section, a voting section, a line extraction section, and a determination section. The parallax image acquisition section is configured to acquire a parallax image in which a parallax is associated with each pixel from an image captured by the stereo camera. The voting section is configured to vote the parallax associated with each pixel in the parallax image to a two-dimensional matrix of the parallax and a pixel in a vertical direction in the parallax image. The line extraction section is configured to extract a line from a coordinate system in which the parallax having the number of votes by the voting section that is greater than or equal to a threshold value is plotted, and in which an X-axis indicates the parallax and a Y-axis indicates the pixel in the vertical direction. The determination section is configured such that, in a case where a first line and a second line are detected by the line extraction section, an X-coordinate of the start point coordinates of the second line is greater than an X-coordinate of end point coordinates of the first line, and a difference between a slope of the first line and a slope of the second line falls within a permissible range, the determination section determines that the low position is present at a position farther from the movable body than a position in real space that corresponds to a Y-coordinate of start point coordinates of the second line.

Example 2

A position detection method is executed by a position detection apparatus mounted on a movable body. The position detection method includes: capturing an image with a stereo camera; acquiring a parallax image in which a parallax is associated with each pixel from the image captured by the stereo camera; voting the parallax associated with each pixel in the parallax image to a two-dimensional matrix of the parallax and a pixel in a vertical direction in the parallax image; extracting a line from a coordinate system in which the parallax having the number of votes obtained by voting the parallax that is greater than or equal to a threshold value is plotted, and in which an X-axis indicates the parallax and a Y-axis indicates the pixel in the vertical direction; detecting a first line and a second line by extracting the line, an X-coordinate of start point coordinates of the second line being greater than an X-coordinate of end point coordinates of the first line, a difference between a slope of the first line and a slope of the second line falling within a permissible range; and determining, in a case where the first line and the second line are detected, that a low position that is a position lower than a road surface on which the movable body is present is present at a position farther from the movable body than a position in real space corresponding to a Y-coordinate of the start point coordinates of the second line.

Example 3

A non-transitory computer readable storage medium is provided that stores a program that causes a processor to perform the various processes described in Examples 1 or 2.

According to the present disclosure, it is possible to detect a low position without improving an infrastructure.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A position detection apparatus according to a first embodiment of the present disclosure will now be described with reference to FIGS. 1 to 9.

Figure 1:
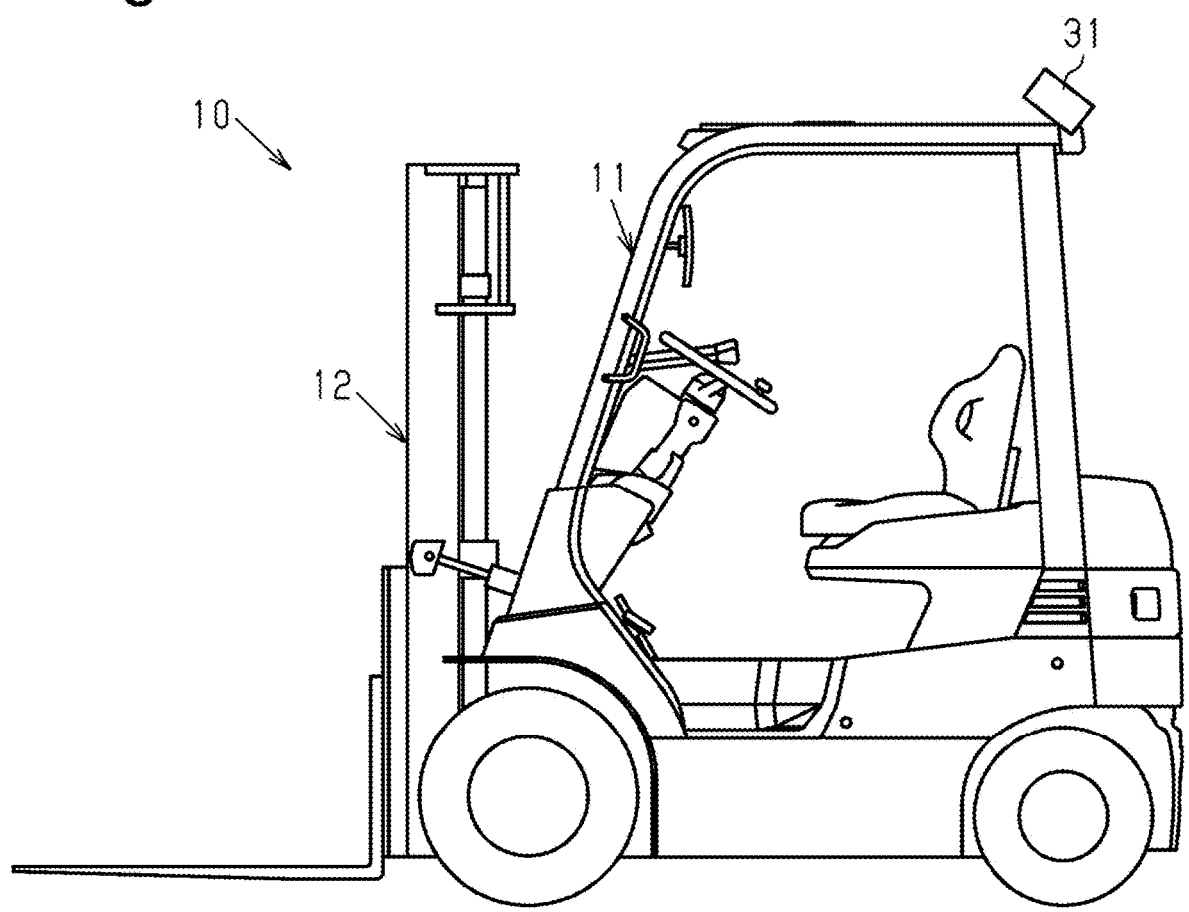
FIG. 1 is a side view of a forklift on which a position detection apparatus according to a first embodiment of the present disclosure is mounted.

As shown in FIG. 1, a forklift 10 includes a vehicle body 11 and a cargo-handling apparatus 12 provided in the vehicle body 11. The forklift 10 may automatically perform a travel operation and a cargo-handling operation, and the travel operation and the cargo-handling operation may also be performed by an operation by a person on board.

Figure 2:
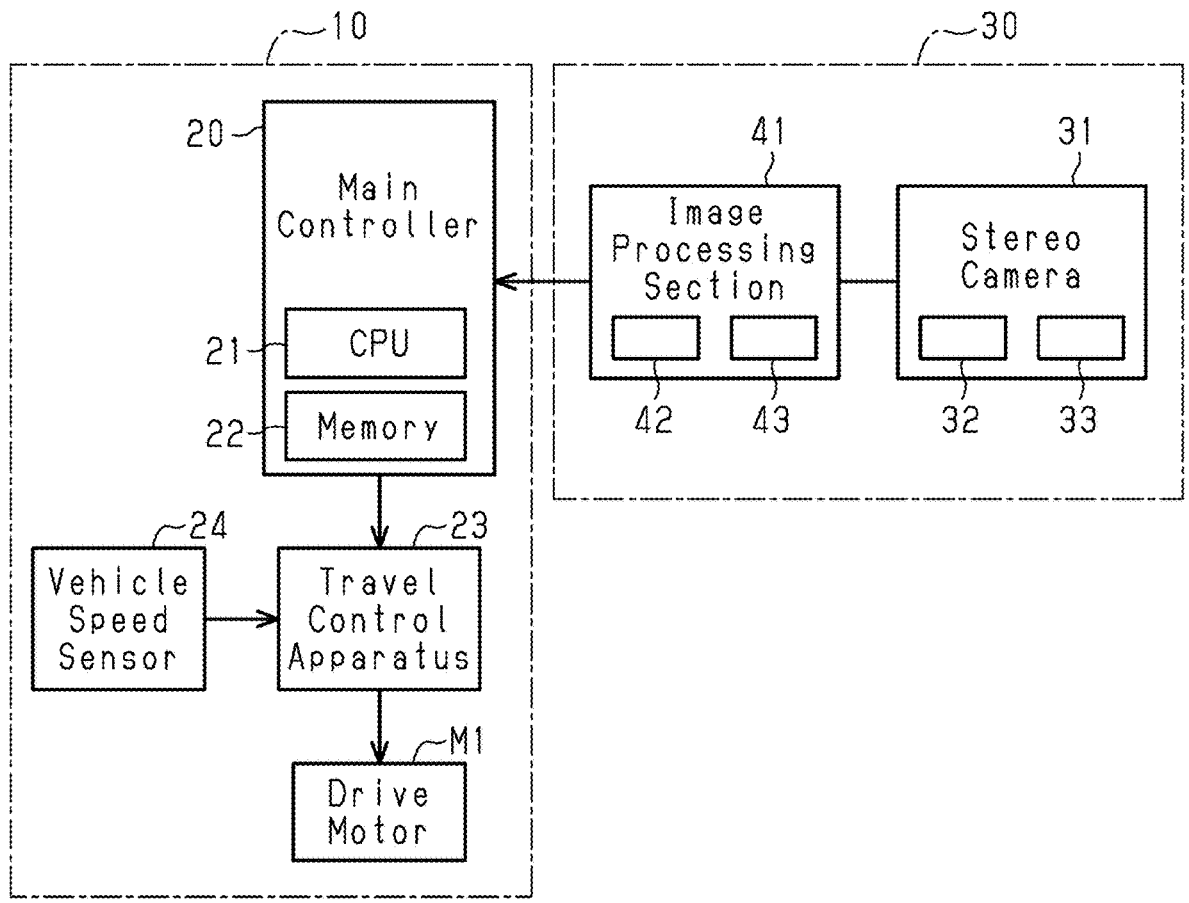
FIG. 2 is a schematic configuration diagram of the forklift in FIG. 1 and the position detection apparatus.

As shown in FIG. 2, the forklift 10 includes a main controller 20, a drive motor M1, a travel control apparatus 23 that controls the drive motor M1, and a vehicle speed sensor 24. The main controller 20 performs control related to the travel operation and the cargo-handling operation. The main controller 20 includes a CPU 21, and a memory 22 in which programs for performing various control operations are stored.

The CPU 21 of the main controller 20 issues a command related to the rotational speed of the drive motor M1 to the travel control apparatus 23 such that the vehicle speed of the forklift 10 matches a target speed. The travel control apparatus 23 of the present embodiment is a motor driver. The vehicle speed sensor 24 of the present embodiment is a rotational speed sensor for detecting the rotational speed of the drive motor M1. The vehicle speed sensor 24 outputs the rotational speed of the drive motor M1 to the travel control apparatus 23. The travel control apparatus 23 controls the drive motor M1 based on the command from the main controller 20 such that the rotational speed of the drive motor M1 matches the command.

A position detection apparatus 30, which detects a low position that is a position lower than a road surface on which the forklift 10 is present, is mounted on the forklift 10 serving as a movable body. The position detection apparatus 30 includes a stereo camera 31, and an image processing section 41, which performs image processing of an image captured by the stereo camera 31. For example, the stereo camera 31 is disposed so as to be able to get a bird's eye view of the road surface on which the forklift 10 travels from the upper portion of the forklift 10 such as the upper portion of the vehicle body 11. The vehicle body 11 includes a base, which has a seat and members related to the travel, and a head guard, which is provided above the seat. The stereo camera 31 of the present embodiment captures an image behind the forklift 10. Consequently, the position detection apparatus 30 detects the low position present behind the forklift 10.

The low position present ahead of the forklift 10 may also be detected by using the stereo camera, which captures an image ahead of the forklift 10. In addition, by using separate stereo cameras that capture images ahead of and behind the forklift 10, low positions ahead of and behind the forklift 10 may be detected. That is, by changing the disposition of the stereo camera 31, it is possible to detect the low position that is present in any direction with respect to the forklift 10. In the case where the stereo camera that captures an image ahead of the forklift 10 is provided, the stereo camera is provided in, e.g., the upper portion of the cargo-handling apparatus 12 or the upper portion of the vehicle body 11.

The stereo camera 31 includes two cameras 32 and 33. As the cameras 32 and 33, for example, CCD image sensors and CMOS image sensors are used. The individual cameras 32 and 33 are disposed such that the optical axes of the cameras 32 and 33 are parallel to each other. In the present embodiment, the two cameras 32 and 33 are disposed so as to be arranged in a horizontal direction. It is assumed that one of the two cameras 32 and 33 is a first camera 32, and the other one thereof is a second camera 33. When an image captured by the first camera 32 is referred to as a first image and an image captured by the second camera 33 is referred to as a second image, the same objects in the first image and the second image are displaced in a horizontal direction. Specifically, in the case where the same object is imaged, a displacement corresponding to a distance between the cameras 32 and 33 occurs in pixels [px] in the horizontal direction between the object in the first image and the object in the second image. The first image and the second image have the same number of pixels and, e.g., an image having 640×480 [px]=VGA is used as each of the first and second images. Each of the first image and the second image is an RGB image.

The image processing section 41 includes a CPU 42, and a storage section 43 which includes a RAM and a ROM. The storage section 43 stores various programs for detecting the low position from the image captured by the stereo camera 31. The image processing section 41 is not limited to one that performs software processing on all processes executed by itself. The image processing section 41 may be equipped with a dedicated hardware circuit (e.g., application specific integrated circuit: ASIC) that performs hardware processing on at least some of the processes. That is, the image processing section 41 is may be configured as (a) one or more processors that operate in accordance with a computer program (software), (b) one or more dedicated hardware circuits such as ASICs, or (c) circuitry including combinations thereof. The processor includes a CPU and memories such as a RAM and a ROM. The memory stores program codes or instructions configured to cause the CPU to execute the processing. The memories, that is, non-transitory computer-readable storage medium, include any type of media that are accessible by general-purpose computers and dedicated computers.

Figure 3:
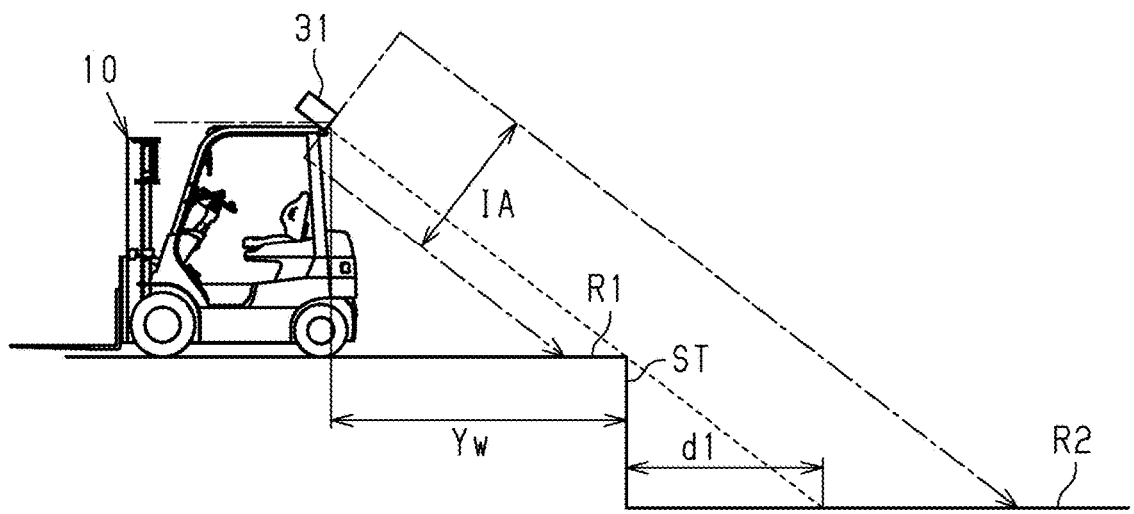
FIG. 3 is a diagram showing a road surface on which the forklift in FIG. 1 is present and a flat surface lower than the road surface.

As shown in FIG. 3, the position detection apparatus 30 of the present embodiment detects a road surface R2, which is a flat surface lower than a road surface R1, on which the forklift 10 is present. The object to be detected is not limited to the road surface R2, and any flat surface lower than the road surface R1 is detected as the low position. The road surface R2 is formed due to a step ST. The road surface R1 is a road surface on a platform which is provided according to the height of a carrier of a truck when, e.g., a cargo is loaded onto or unloaded from the truck by the forklift 10. The road surface R2 is a road surface on which the truck is stopped. The step ST is a portion positioned at a boundary between the road surface R1 and the road surface R2, and is a wall portion which causes a height difference between the road surface R1 and the road surface R2. Hereinbelow, the road surface R1 on which the forklift 10 is present is referred to as a first road surface R1 and the road surface R2 lower than the first road surface R1 is referred to as a second road surface R2, and a description will be made.

Hereinbelow, a low position search process performed by the image processing section 41 will be described together with the operation of the first embodiment. The low position search process is performed when the forklift 10 is in an activated state. The activated state is a state in which it is possible to cause the forklift 10 to perform the travel operation and the cargo-handling operation. In the present embodiment, as shown in FIG. 3, the process in the case where the road surfaces R1 and R2 are imaged by the stereo camera 31 will be described as an example.

Figure 4:
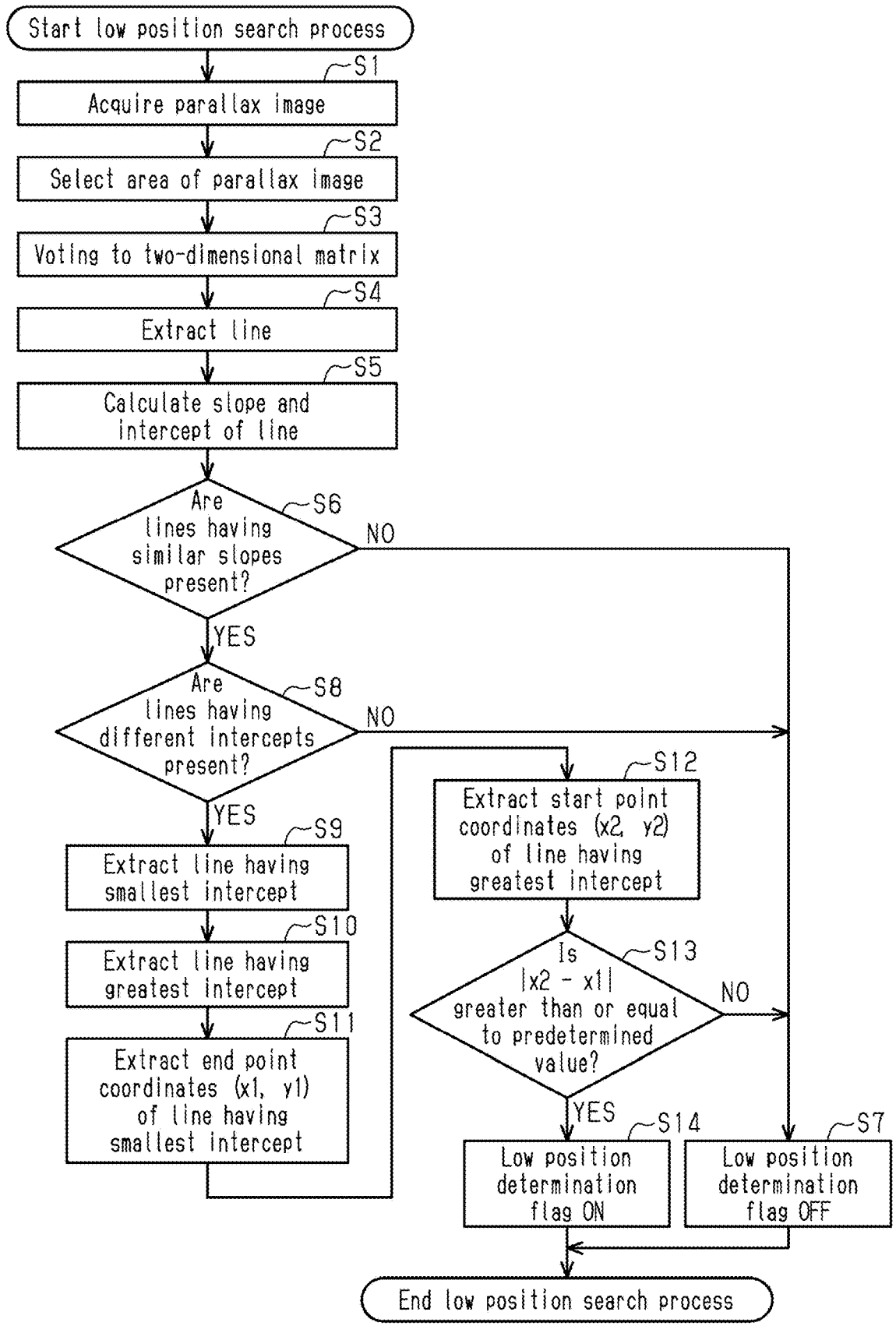
FIG. 4 is a flowchart showing a low position search process in the first embodiment in the forklift in FIG. 1.
Figures 5, 6:
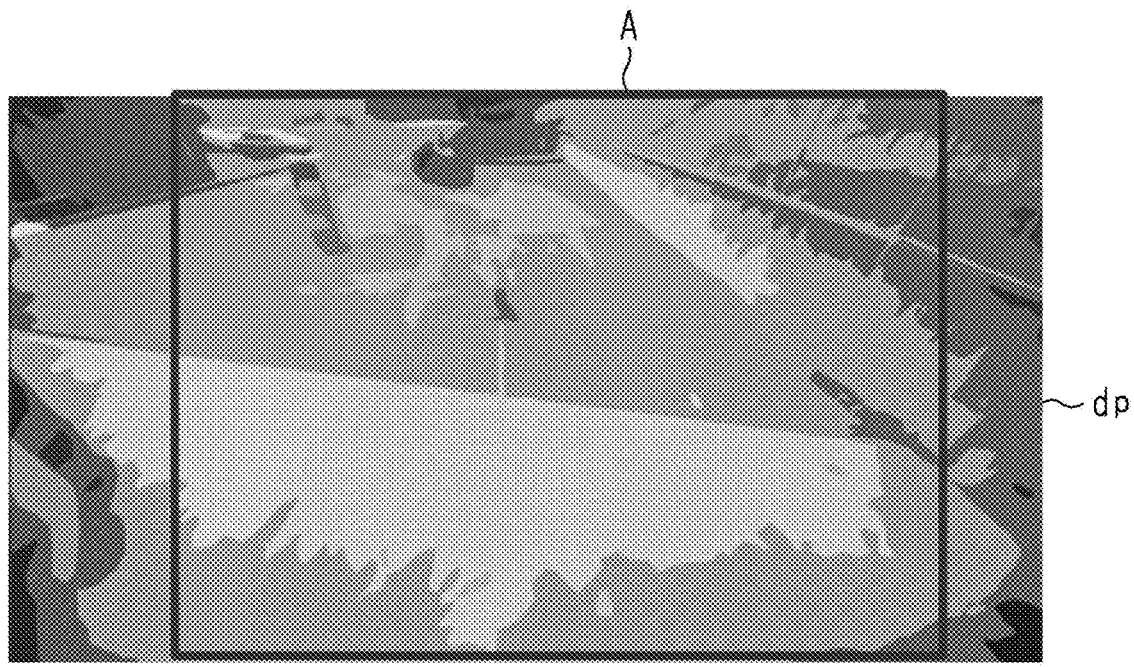
FIG. 5 is a diagram showing a parallax image in the low position search processing in FIG. 4.
FIG. 6 is a diagram showing a two-dimensional matrix in the low position search process in FIG. 4.

As shown in FIGS. 4 and 5, in Step S1, the image processing section 41 acquires a parallax image dp. The parallax image dp is an image in which a parallax [px] is associated with a pixel. The parallax is obtained by comparing the first image with the second image and calculating the difference in the number of pixels between the first image and the second image for the same feature points in the individual images. The feature point is a portion that can be identified as a boundary such as an edge of an object. The feature point can be detected from brightness information and the like.

The image processing section 41 acquires the first image and the second image of the same frame from an image captured by the stereo camera 31. The image processing section 41 performs conversion from RGB to YCrCb by using the RAM in which each image is temporarily stored. The image processing section 41 may perform distortion correction and edge enhancement. The image processing section 41 performs a stereo process in which the parallax is calculated by comparing similarities between the individual pixels in the first image and the individual pixels in the second image. As the stereo process, a method in which the parallax is calculated for each pixel may be used, or a block matching method in which each image is divided into blocks each including a plurality of pixels, and the parallax of each block is calculated may also be used. In the comparison of similarities of the individual pixels, for example, sum of absolute difference (SAD), sum of squared difference (SSD), and the like are used. The image processing section 41 acquires the parallax image dp by using the first image as a reference image and using the second image as a comparison image. The image processing section 41 extracts the pixel in the second image which is most similar to the pixel in the first image for each pixel in the first image, and calculates, as the parallax, the difference in the number of pixels in the horizontal direction between the pixel in the first image and the pixel that is most similar to the pixel in the first image. With this, it is possible to acquire the parallax image dp in which the parallax is associated with each pixel in the first image serving as the reference image. The parallax image dp does not necessarily require display, and denotes data in which the parallax is associated with each pixel in the parallax image dp. In the present embodiment, it can be said that the image processing section 41 functions as a parallax image acquisition section.

FIG. 5 shows an example of the parallax image dp, which is obtained from the first image and the second image. In the parallax image dp shown in FIG. 5, the level of the parallax is represented by shading. The parallax increases with approach to the stereo camera 31, and decreases with distance from the stereo camera 31. Hereinbelow, it is assumed that a coordinate in a horizontal direction of the parallax image dp is an X-coordinate, and a coordinate in a vertical direction of the parallax image dp is a Y-coordinate. The X-coordinate indicates a pixel position in the horizontal direction, and the Y-coordinate indicates the pixel position in the vertical direction. The X-coordinate of the pixel in the horizontal direction of the parallax image dp decreases progressively in a left direction, and the Y-coordinate of the pixel in the vertical direction decreases progressively in an upward direction. It can be said that the pixel in the vertical direction moves away from the stereo camera 31 as the Y-coordinate of the pixel in the vertical direction decreases, and the pixel in the vertical direction approaches the stereo camera 31 as the Y-coordinate of the pixel in the vertical direction increases. The X-coordinate of the center coordinates of the parallax image dp corresponds to the center of the forklift 10 in a width direction. In the following description, the pixel in the vertical direction is referred to as a vertical pixel, and the pixel in the horizontal direction is referred to as a horizontal pixel.

Next, as shown in FIGS. 4 and 5, in Step S2, the image processing section 41 selects an area A for detecting the low position from the parallax image dp. Within the limits of the area A in the parallax image dp, the number of pixels in the horizontal direction in the area A is smaller than the number of pixels in the horizontal direction in the parallax image dp, and the number of pixels in the vertical direction in the area A is equal to the number of pixels in the vertical direction in the parallax image dp. The parallax image dp includes a portion that is not included in the area A, and the detection of the low position is not performed on the portion. The number of pixels in the horizontal direction in the area A is set according to the width of the forklift 10, and it can be said that the area A is an area through which the forklift 10 is expected to pass.

Next, as shown in FIGS. 4 and 6, in Step S3, the image processing section 41 votes the parallax associated with each pixel in the area A to a two-dimensional matrix of the parallax and the vertical pixel in the parallax image dp. As shown in FIG. 6, in a row direction of the two-dimensional matrix, each row corresponds to the same vertical pixel [px], and the first row to the last row correspond to values from 1 to the maximum value of the Y-coordinate of the vertical pixel. In a column direction of the two-dimensional matrix, each column corresponds to the same parallax, and the first column to the last column correspond to values from 1 to the maximum value of the parallax in the area A. The two-dimensional matrix represents the frequencies of the parallaxes associated with pixels having the same vertical pixel (Y-coordinate) and different horizontal pixels (X-coordinates). That is, in Step S3, it can be said that, in the case where the area A is divided for each area having the same vertical pixel (Y-coordinate) in the horizontal direction, the frequencies of the parallaxes of each area having the same vertical pixel (Y-coordinate) are determined. In the present embodiment, the image processing section 41 functions as a voting section.

Figure 7:
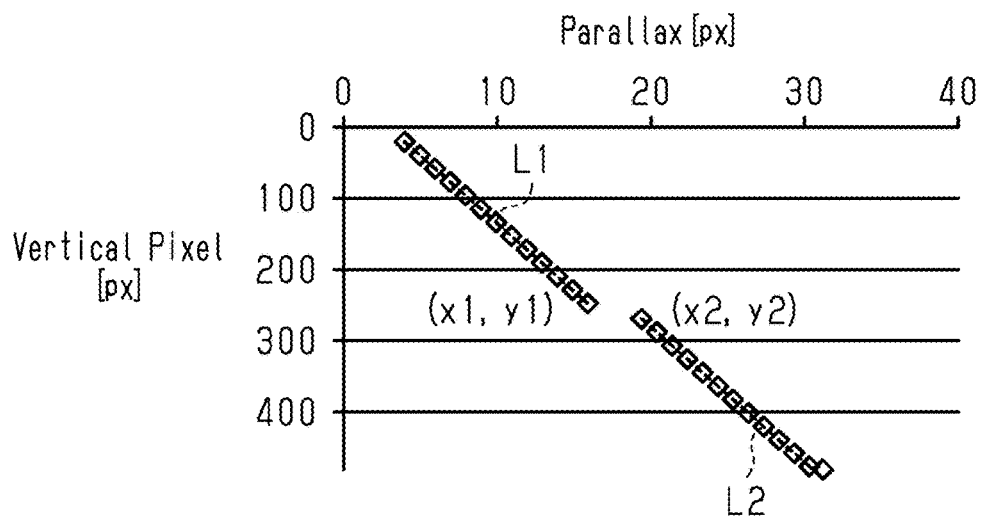
FIG. 7 is a diagram showing lines obtained by line extraction in the low position search process in FIG. 4.

Next, as shown in FIGS. 4 and 7, in Step S4, the image processing section 41 extracts lines L1 and L2. As shown in FIG. 7, first, the image processing section 41 plots the parallax having the number of votes that is greater than or equal to a threshold value in a coordinate system in which an X-axis indicates the parallax and a Y-axis indicates the pixel in the vertical direction. The image processing section 41 extracts the lines L1 and L2 using the Hough transform from the coordinate system in which the parallax having the number of votes that is greater than or equal to the threshold value is plotted. The method for extracting the lines L1 and L2 is not limited to the Hough transform, and the extraction of the lines L1 and L2 can be performed using line segment detector (LSD) or random sample consensus (RANSAC). In the case where the frequency of the parallax is determined for each vertical pixel, the frequency of the parallax caused by each of the road surfaces R1 and R2 which are ground surfaces extending in a horizontal direction tends to be the highest frequency. This is because, in the case where an image below the forklift 10 is captured from the upper portion of the forklift 10, the area of the road surfaces R1 and R2 in the image tends to be greatest. With regard to the threshold value mentioned above, for example, it is preferable to be able to extract the parallax caused by the ground surface such as the road surface R1 or R2 for each vertical pixel. It can be said that the lines L1 and L2 obtained by the Hough transform represent distances from the stereo camera 31 to the road surfaces R1 and R2 based on change of the vertical pixel. In some cases, the parallax caused by an object other than the road surfaces R1 and R2 such as an object disposed on the road surface R1 or R2 may exceed the threshold value in part of a plurality of the vertical pixels. Even in those cases, by performing feature detection by the Hough transform, it is possible to obtain the lines L1 and L2 based on the parallaxes caused by the road surfaces R1 and R2. In the present embodiment, the image processing section 41 functions as a line extraction section.

Next, as shown in FIGS. 4 and 7, in Step S5, the image processing section 41 calculates the slopes and intercepts of the lines L1 and L2 extracted in Step S4. In the case where a plurality of the lines L1 and L2 are extracted in Step S4, the image processing section 41 individually calculates the slope and intercept for each of the lines L1 and L2.

Next, in Step S6, the image processing section 41 determines whether or not a plurality of the lines L1 and L2 having similar slopes are present. In the case where the low position lower than the road surface R1 is not present in the image captured by the stereo camera 31, one line based on the parallax caused by the road surface R1 is obtained. The line is a single line in which the Y-coordinate increases as the X-coordinate increases. It can be said that the slope of the line represents the inclination of the road surface R1.

As shown in FIG. 3, in the case where the step ST is present on the first road surface R1, the second road surface R2 lower than the first road surface R1 is present with the step ST serving as the boundary therebetween. FIG. 3 schematically shows an imaging area IA of the stereo camera 31. The imaging area IA shown in FIG. 3 is an area defined by the vertical angle of view of the stereo camera 31, and is an area corresponding to the vertical pixels. As can be seen from FIG. 3, in the case where the second road surface R2 is present, since the second road surface R2 is lower than the first road surface R1, the distance from the stereo camera 31 to the second road surface R2 becomes greater than a distance from the stereo camera 31 to the first road surface R1 correspondingly to the height difference between the first road surface R1 and the second road surface R2, which is lower than the first road surface R1. In addition, part of the second road surface R2 becomes a blind spot due to the step ST and, as a result, the difference in distance resulting from the length dl of the blind spot portion is caused in the image. That is, in the case where the image of the stereo camera 31 includes the step ST, a large difference between the distance from the stereo camera 31 to the first road surface R1 and the distance from the stereo camera 31 to the second road surface R2 is caused with the step ST serving as the boundary therebetween. In the case where the second road surface R2 is in the image of the stereo camera 31, for example, unlike the case where the second road surface R2 is not in the image thereof, a portion where a distance from the stereo camera 31 significantly changes is present. The parallax changes according to the distance from the stereo camera 31, and hence, when the second road surface R2 is present in the image, a large change is seen in the parallax. As a result, in the case where the first road surface R1 and the second road surface R2 lower than the first road surface R1 are imaged by the stereo camera 31, the line L2 corresponding to the parallax of the first road surface R1 and the line L1 corresponding to the parallax of the second road surface R2 are individually extracted. Note that the line L1 corresponds to the parallax of the second road surface R2 instead of the parallax of the first road surface R1, and the line L2 corresponds to the parallax of the first road surface R1 instead of the parallax of the second road surface R2. The number of obtained lines changes according to the number of steps ST. For example, [the number of obtained lines]= [the number of steps ST]+1 is satisfied.

It is possible to determine whether or not the slope of the line L1 and the slope of the line L2 are similar to each other by determining whether or not the difference between the slope of the line L1 and the slope of the line L2 falls within a permissible range. When the difference between the slopes of the lines L1 and L2 falls within the permissible range, it can be said that the slopes of the line L1 and the line L2 are similar to each other. As the permissible range, in consideration of a measurement error and the like, a range which allows the slopes of the line L1 and the line L2 to be considered to be equal to each other is set.

As shown in FIG. 4, in the case where the determination result in Step S6 is negative, the image processing section 41 turns off a low position determination flag in Step S7, and ends the low position search process. Specifically, in the case where the low position determination flag is in the OFF state, the image processing section 41 maintains the OFF state of the low position determination flag in the current control cycle. On the other hand, in the case where the low position determination flag has been turned on in a previous control cycle, the image processing section 41 turns off the low position determination flag.

In the case where the determination result in Step S6 is affirmative, the image processing section 41 determines whether or not a plurality of lines (specifically, L1 and L2) having different intercepts are present in Step S8. In the case where the first road surface R1 and the second road surface R2 lower than the first road surface R1 are separately present with the step ST serving as the boundary therebetween, one of the two lines L1 and L2 is displaced relative to the other one of the lines L1 and L2 in an X-axis direction. When one of the two lines L1 and L2 is displaced relative to the other one of the lines L1 and L2 in the X-axis direction, the intercepts of the two lines L1 and L2 have different values. Consequently, in the case where the determination result in Step S8 is negative, it is possible to determine that the second road surface R2 lower than the first road surface R1 is not present. The intercept denotes the point of intersection of the line L1 or L2 and the X-axis or the Y-axis and, e.g., the point of intersection of the line L1 or L2 and the X-axis is used as the intercept. The point of intersection of the line L1 or L2 and the Y-axis may also be used.

In the case where the determination result in Step S8 is negative, the image processing section 41 performs the process in Step S7. In the case where the determination result in Step S8 is affirmative, the image processing section 41 extracts, from a plurality of the lines L1 and L2 that have the same slope and have different intercepts, the line L1 having the smallest intercept in Step S9. Next, in Step S10, the image processing section 41 extracts, from a plurality of the lines L1 and L2 that have the same slope and have different intercepts, the line L2 having the greatest intercept. The difference in intercept between the lines L1 and L2 depends on the height difference between the first road surface R1 and the second road surface R2, and the difference in intercept between the lines L1 and L2 becomes greater as the second road surface R2 becomes lower than the first road surface R1.

Hereinbelow, the line L1 having the smallest intercept is used as a first line, and the line L2 having the greatest intercept is used as a second line. The first line L1 is a line obtained based on the parallax caused by the second road surface R2, and the second line L2 is a line obtained based on the parallax caused by the first road surface R1.

As shown in FIGS. 4 and 7, in Step S11, the image processing section 41 extracts end point coordinates (x1, y1) of the first line L1 with respect to the first line L1 having the smallest intercept among a plurality of the lines. The end point coordinates (x1, y1) are the coordinates of the first line L1 which have the greatest vertical pixel=the Y-coordinate. That is, the end point coordinates (x1, y1) indicate a position in the second road surface R2 in the image which is closest to the stereo camera 31. In Step S12, the image processing section 41 extracts start point coordinates (x2, y2) of the second line L2 with respect to the second line L2 having the greatest intercept among a plurality of the lines. The start point coordinates (x2, y2) are the coordinates of the second line L2 which have the smallest vertical pixel=the Y-coordinate. That is, the start point coordinates (x2, y2) indicate a position in the first road surface R1 in the image which is farthest from the stereo camera 31. The coordinates of the step ST can be considered to be identical to the start point coordinates (x2, y2) of the second line L2.

In Step S13, the image processing section 41 determines whether or not the value of |x2−x1|, which is the difference between the X-coordinate of the end point coordinates (x1, y1) of the first line L1 and the X-coordinate of the start point coordinates (x2, y2) of the second line L2, is greater than or equal to a predetermined value. |x2−x1| increases as the difference between the position in the first road surface R1 in the image that is farthest from the stereo camera 31 and the position in the second road surface R2 in the image that is closest to the stereo camera 31 increases. It can be said that |x2−x1| increases as the height difference between the first road surface R1 and the second road surface R2 increases. Consequently, it can be said that |x2−x1| represents the height difference between the first road surface R1 and the second road surface R2. The predetermined value is a threshold value for determining whether or not the forklift 10 can get over the height difference between the first road surface R1 and the second road surface R2. For example, when the height difference between the first road surface R1 and the second road surface R2 is less than the radius of the wheel of the forklift 10, the forklift 10 can get over the step ST and move and, when the height difference therebetween is greater than or equal to the radius thereof, the forklift 10 cannot move (cannot get over the step ST). By setting the predetermined value based on |x2−x1| when the height difference between the first road surface R1 and the second road surface R2 is equal to the radius of the wheel, it is possible to determine whether or not the forklift 10 can move toward the step ST by using the predetermined value. In the case where the determination result in Step S13 is negative, it can be said that the step ST toward which the forklift 10 can move is present on the first road surface R1. In the case where the determination result in Step S13 is affirmative, it can be said that the step ST toward which the forklift 10 cannot move is present on the first road surface R1. In the present embodiment, the image processing section 41 functions as a determination section.

In the case where the determination result in Step S13 is negative, the image processing section 41 performs the process in Step S7. On the other hand, in the case where the determination result in Step S13 is affirmative, the image processing section 41 performs the process of Step S14. In Step S14, the image processing section 41 turns on the low position determination flag. Specifically, in the case where the low position determination flag is in the OFF state, the image processing section 41 turns on the low position determination flag in the current control cycle. On the other hand, in the case where the low position determination flag has been turned on in the previous control cycle, the image processing section 41 maintains the ON state, and ends the low position search process.

When the low position determination flag is turned on, a vehicle speed limitation process is performed. The vehicle speed limitation processing is continuously performed while the low position determination flag is in the ON state, and is suspended when the low position determination flag is turned off. Hereinbelow, the vehicle speed limitation process will be described.

Figure 8:
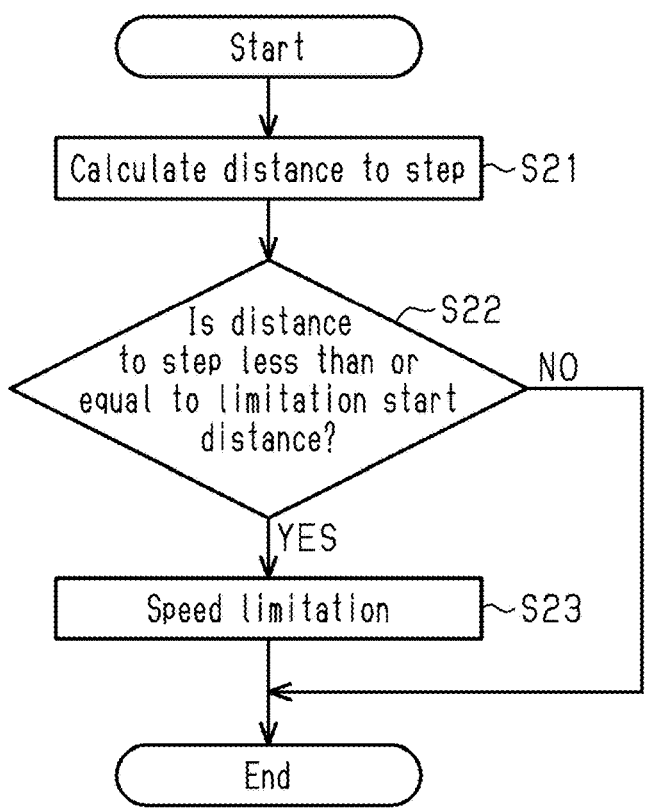
FIG. 8 is a flowchart showing a vehicle speed limitation process in the forklift in FIG. 1.

As shown in FIG. 8, in Step S21, the image processing section 41 calculates the distance from the stereo camera 31 to the step ST. The image processing section 41 calculates the position of the step ST in a camera coordinate system. The camera coordinate system is a three-axis orthogonal coordinate system in which an optical axis is used as a Z-axis, and two axes orthogonal to the optical axis are used as an X-axis and a Y-axis. The position of the step ST in the camera coordinate system can be represented by a Z-coordinate Zc, an X-coordinate Xc, and a Y-coordinate Yc in the camera coordinate system. The Z-coordinate Zc, the X-coordinate Xc, and the Y-coordinate Yc can be calculated by using the following Expressions (1) to (3).

$$Zc = \frac{B \times f}{d} \tag{1}$$

-continued $$Xc = (xp - x') \times \frac{Zc}{f} \quad (2)$$

$$Yc = (yp - y') \times \frac{Zc}{f} \quad (3)$$

B is an interocular distance=a base length [m] of the stereo camera 31, f is a focal length [m], and d is a parallax [px]. xp is any X-coordinate in a parallax image dp, and x' is a center X-coordinate in the parallax image dp. yp is any Y-coordinate in the parallax image dp, and y' is a center Y-coordinate in the parallax image dp. By obtaining the parallax corresponding to the coordinates of the step ST, it is possible to obtain the position of the step ST in the camera coordinate system from Expressions (1) to (3).

It is assumed that coordinates in a three-axis orthogonal coordinate system in which an axis extending in the movement direction of the forklift 10 is used as a Y-axis, an axis extending in a vertical direction is used as a Z-axis, and an axis orthogonal to the Y-axis and the Z-axis is used as an X-axis are world coordinates serving as coordinates in real space. The position of an object in real space can be represented by an X-coordinate Xw, a Y-coordinate Yw, and a Z-coordinate Zw in real space.

The image processing section 41 transforms the camera coordinate system into a world coordinate system by using the following Expression (4).

$$\begin{pmatrix} Xw \\ Yw \\ Zw \end{pmatrix} = \begin{pmatrix} 1 & 0 & 0 \\ 0 & \cos\theta & -\sin\theta \\ 0 & \sin\theta & \cos\theta \end{pmatrix} \begin{pmatrix} Xc \\ Yc \\ Zc \end{pmatrix} + \begin{pmatrix} 0 \\ 0 \\ H \end{pmatrix} \quad (4)$$

H is a mounting height of the stereo camera 31 in the world coordinate system, and θ is an angle that corresponds to [the angle formed by the optical axis of each of the cameras 32 and 33 and the horizontal plane]+90°.

As described above, the start point coordinates (x2, y2) of the second line L2 represent the coordinates of the step ST, i.e., the end position of the first road surface R1, that is, the position in the first road surface R1 that is farthest from the forklift 10. Accordingly, by satisfying d=[the X-coordinate x2 of the start point coordinates (x2, y2)], xp=x', and yp=[the Y-coordinate y2 of the start point coordinates (x2, y2)], and using Expressions (1) to (3), it is possible to calculate the position of the step ST in the camera coordinate system. Subsequently, by transforming the position of the step ST in the camera coordinate system into the position thereof in the world coordinates by using Expression (4), it is possible to calculate the position of the step ST in real space. Considering that the step ST tends to extend in the horizontal direction in the parallax image dp, the value of xp may be set to any value of the X-coordinate in the area A.

The step ST is a coordinate in real space corresponding to y2, which is the Y-coordinate of the start point coordinates (x2, y2) of the second line L2. Consequently, the image processing section 41 can determine that the second road surface R2 is present at the position farther from the forklift 10 than the position in real space corresponding to the Y-coordinate of the start point coordinates (x2, y2) of the second line L2.

It can be said that the Y-coordinate Yw of the world coordinates represents a distance from the forklift 10 to the step ST in the movement direction of the forklift 10, i.e., the relative distance between the forklift 10 and the step ST. The image processing section 41 outputs the coordinate of the step ST in real space to the main controller 20.

Next, in Step S22, the main controller 20 obtains the distance from the forklift 10 to the step ST from the coordinate of the step ST outputted from the image processing section 41, and also determines whether or not the distance is less than or equal to a limitation start distance. The limitation start distance denotes a distance set in consideration of the maximum speed of the forklift 10 and an environment where the forklift 10 is used such that the forklift 10 can be prevented from entering the step ST. The main controller 20 ends the process in the case where the determination result in Step S22 is negative. On the other hand, the main controller 20 imposes speed limitation in Step S23 in the case where the determination result in Step S22 is affirmative.

Figure 9:
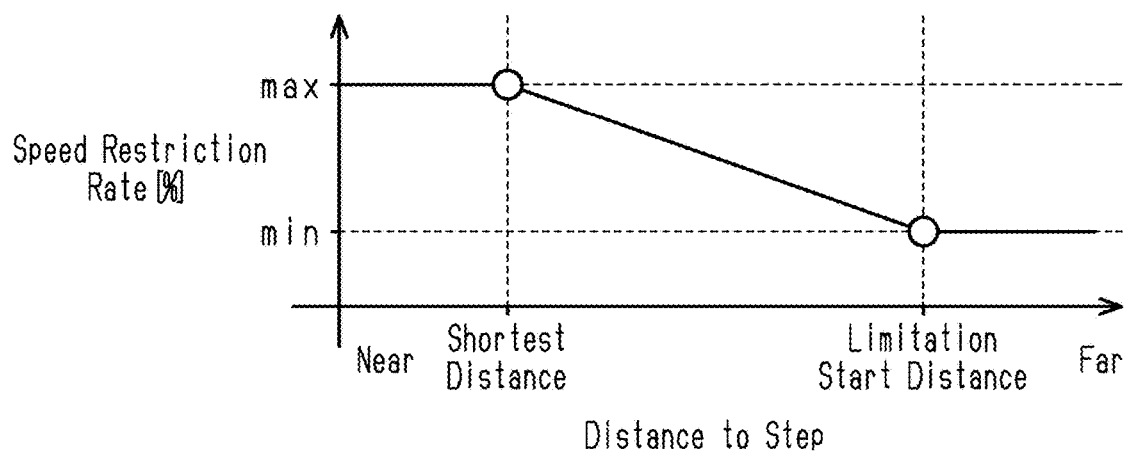
FIG. 9 is a diagram showing the relationship between a distance from the forklift in FIG. 1 to a step and a speed restriction rate.

As shown in FIG. 9, the speed limitation of the forklift 10 becomes more severe as the distance from the forklift 10 to the step ST becomes shorter. In the present embodiment, the speed limitation is imposed as a speed restriction rate to the maximum speed that can be achieved by the forklift 10. The main controller 20 gradually increases the speed restriction rate from the limitation start distance toward the shortest distance which maximizes the speed restriction rate. The maximum value of the speed restriction rate to be used may be the speed restriction rate 100%=[the stop of the forklift 10], or may also have a value less than 100%. The main controller 20 executes the speed limitation of the forklift 10 by using a speed corresponding to the speed restriction rate as the upper limit and issuing a command to the travel control apparatus 23. With this, the forklift 10 is prevented from entering the step ST, and hence it is possible to prevent the forklift 10 from becoming unable to travel.

The first embodiment has the following advantages.

(1-1) The image processing section 41 acquires the parallax image dp from the image obtained by the stereo camera 31, and detects the step ST by using the parallax. Subsequently, it is possible to calculate the distance from the forklift 10 to the step ST from the parallax caused by the step ST. Consequently, it is possible to detect the low position without improving an infrastructure.

(1-2) The image processing section 41 extracts a plurality of the lines L1 and L2 having different intercepts, and extracts the end point coordinates (x1, y1) of the first line L1 and the start point coordinates (x2, y2) of the second line L2. Subsequently, by comparing the X-coordinate of the end point coordinates (x1, y1) of the first line L1 with the X-coordinate of the start point coordinates (x2, y2) of the second line L2, it is possible to detect the second road surface R2 formed due to the step ST.

Second Embodiment

A position detection apparatus 30 according to a second embodiment of the present disclosure will now be described with reference to FIGS. 10 to 12. The components of the second embodiment that are the same as the corresponding components of the first embodiment will not be described in detail.

Figure 10:
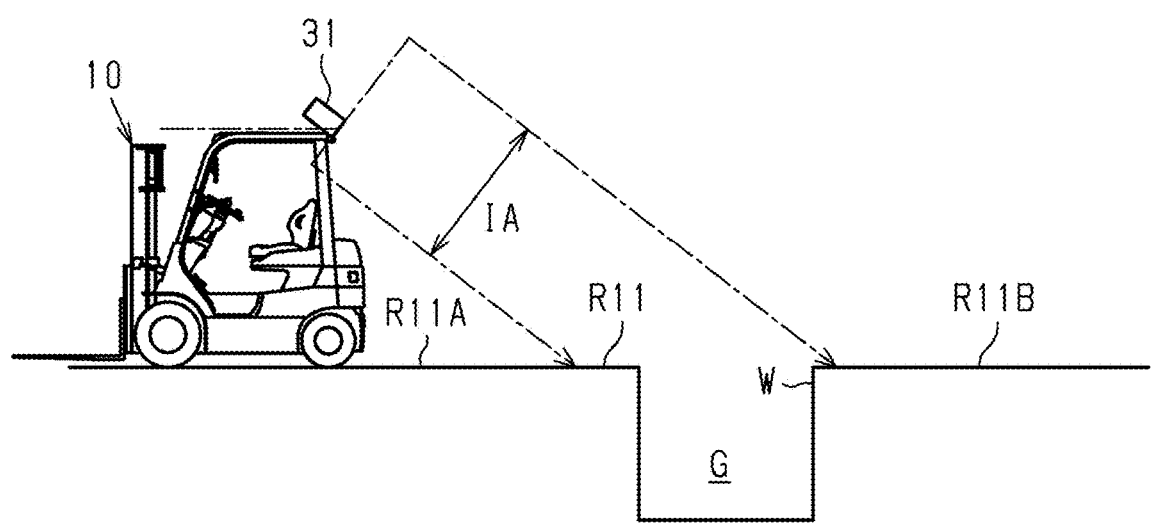
FIG. 10 is a diagram showing the road surface on which the forklift is present and a ditch in a second embodiment of the present disclosure.

As shown in FIG. 10, in the second embodiment, a ditch G, which is recessed in the vertical direction from a road surface R11 on which the forklift 10 is present, is detected as the low position. The ditch G denotes a position where, in the case where portions R11A and R11B of the road surface on the opposite sides of the ditch G are virtually extended, the extended portions of the portions R11A and R11B overlap each other without forming undulations. When the road surface R11 is a flat surface which is not inclined, it can be said that the portions R11A and R11B on the opposite sides of the ditch G do not have a height difference. Alternatively, more specifically, a height difference which can be ignored when the forklift 10 is caused to travel is present between the portions R11A and R11B on the opposite sides thereof.

Figure 11:
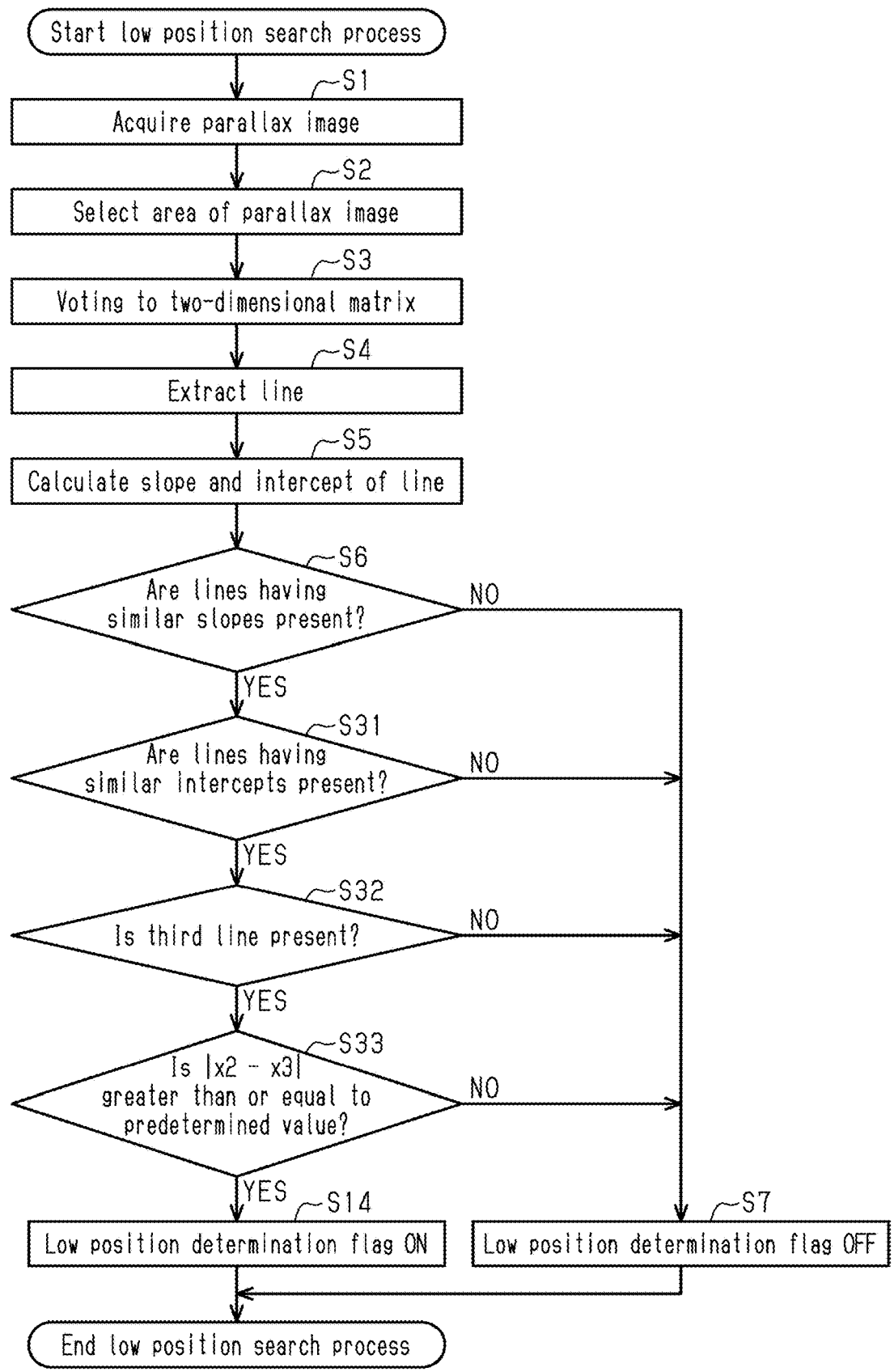
FIG. 11 is a flowchart showing the low position search process in the second embodiment.

As shown in FIG. 11, in Steps S1 to S7, the image processing section 41 performs processes identical to those in the first embodiment. Hereinbelow, the low position search process in the second embodiment will be described together with the operation of the second embodiment.

Figure 12:
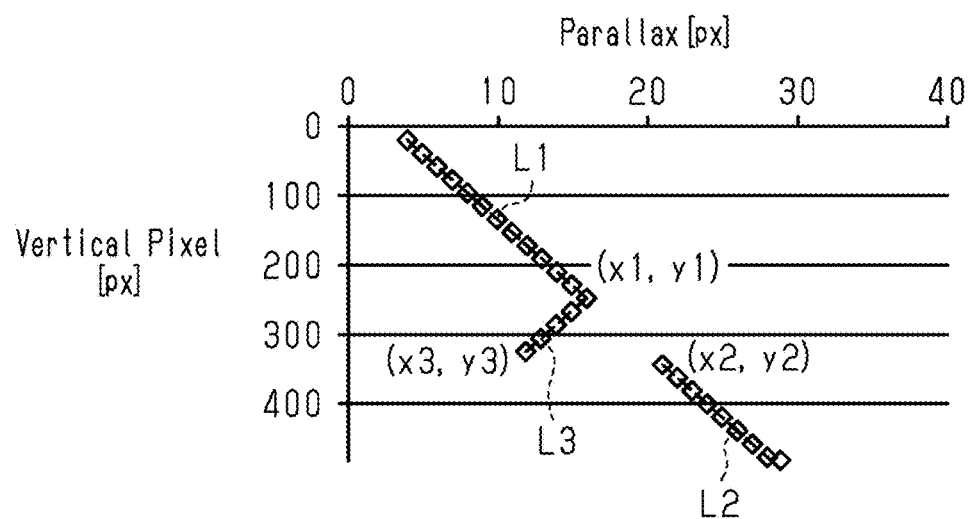
FIG. 12 is a diagram showing lines obtained by the line extraction in the low position search process in FIG. 11.

As shown in FIGS. 11 and 12, the image processing section 41 performs the process of Step S31 subsequently to the processes in Steps S1 to S6. In Step S31, the image processing section 41 determines whether or not, among a plurality of the lines L1 and L2 having similar slopes, a plurality of the lines L1 and L2 having similar intercepts are present. It is possible to determine whether or not the intercepts are similar to each other by determining whether or not the difference in intercept between a plurality of the lines L1 and L2 falls within a permissible range. The permissible range is set to a value that allows the intercepts of the lines L1 and L2 to be considered to be identical to each other in consideration of a measurement error and the like. One of a plurality of the lines L1 and L2 is used as a first line L1 and, in the case where the X-coordinate of the start point coordinates (x2, y2) of the line L2 is greater than the X-coordinate of the end point coordinates (x1, y1) of the first line L1, the line L2 is used as a second line L2. In this case, the lines L1 and L2 having similar slopes and having similar intercepts are extracted. In the case where three or more lines having similar slopes and having similar intercepts are present, any two lines of the three or more lines may be used as the first line and the second line, and the following processes may be performed on each combination of the first line and the second line. In addition, in the case where three or more lines having similar slopes and having similar intercepts are present, the start point coordinates of the individual lines may be compared with each other, and the line having the greatest Y-coordinate may be used as the second line and the line having the second greatest Y-coordinate may be used as the first line. As the Y-coordinate increases, the distance to the stereo camera 31 decreases, and hence it is possible to detect the ditch G closest to the stereo camera 31 by using the line having the greatest Y-coordinate.

In the case where the determination result in Step S31 is negative, the image processing section 41 turns off the low position determination flag in Step S7. On the other hand, in the case where the determination result in Step S31 is affirmative, the image processing section 41 performs the process of Step S32.

In Step S32, the image processing section 41 determines whether or not a third line L3 is present. The third line L3 is a line that extends from the end point coordinates (x1, y1) of the first line L1 and in which the X-coordinate decreases as the Y-coordinate increases. The positive and negative of the slope of the third line L3 are opposite to the positive and negative of the slope of the first line L1.

As shown in FIG. 10, in the case where the ditch G is present on the road surface R11, with regard to a parallax caused by the portion R11A of the road surface R11 that is located on the side of the forklift 10 of the ditch G, the parallax gradually increases with approach to the stereo camera 31. In the case where the ditch G is imaged by the stereo camera 31, in each image, a pixel serving as a boundary between a portion of a wall surface W of the ditch G and a portion of the portion R11A is present. The wall surface W denotes, among a plurality of wall surfaces that constitute the ditch G, a wall surface that intersects the portion R11B of the road surface R11, which is positioned away from the forklift 10 beyond the ditch G. In a portion of a pixel serving as a boundary between the wall surface W and the portion R11B, a distance from the stereo camera 31 changes more significantly than in the case where the road surface R11 is, e.g., flat. Consequently, one line L2 is obtained from the portion R11A of the road surface R11 on the side of the forklift 10 of the ditch G. The line L2 serves as the second line L2.

The wall surface W is a surface that extends in the vertical direction, and hence the distance to the stereo camera 31 decreases as the Y-coordinate of the vertical pixel decreases in the wall surface W. When the wall surface W is a flat surface, the parallax gradually increases as the Y-coordinate of the vertical pixel in the parallax image dp decreases. Consequently, one line L3 is obtained from the wall surface W which constitutes the ditch G. The line L3 corresponding to the wall surface W serves as the third line L3.

The wall surface W and the portion R11B intersect each other, and the point of intersection thereof is in the image. That is, in the image, the pixel serving as the boundary between the portion of the wall surface W and the portion of the portion R11B is present. In the portion R11B of the road surface R11, the parallax increases as the Y-coordinate of the vertical pixel increases. In addition, the portions R11A and R11B on the opposite sides of the ditch G are flush with each other in the case where the ditch G is not present, and hence, in the case where the ditch G is present, lines obtained by removing the parallax corresponding to the ditch G from a single line are obtained from the portions R11A and R11B. Consequently, when the portion corresponding to the ditch G, which lacks the parallax, is removed, the lines L1 and L2 obtained from the portions R11B and R11A on the opposite sides of the ditch G have the same intercept and the same slope. Consequently, the line L1 having the same intercept as that of the second line L2 serves as the first line L1. A portion corresponding to the point of intersection of the first line L1 and the third line L3 is in the image, whereby the third line L3 becomes a line extending from the end point coordinates (x1, y1) of the first line L1. The start point coordinates of the third line L3 can be considered to be identical to the end point coordinates (x1, y1) of the first line L1. The angle formed by the first line L1 and the third line L3 changes according to the angle formed by the wall surface W and the portion R11B and, when the wall surface W and the portion R11B are perpendicular to each other, the first line L1 and the third line L3 are perpendicular to each other.

In the case where the determination result in Step S32 is negative, the image processing section 41 performs the process in Step S7. In the case where the determination result in Step S32 is affirmative, the image processing section 41 performs the process of Step S33.

In Step S33, the image processing section 41 determines whether or not the value of |x2−x3|, which is the difference between the X-coordinate of end point coordinates (x3, y3) of the third line L3 and the X-coordinate of the start point coordinates (x2, y2) of the second line L2 is greater than or equal to a predetermined value. |x2−x3| which is the difference between the X-coordinate of the end point coordinates (x3, y3) of the third line L3 and the X-coordinate of the start point coordinates (x2, y2) of the second line L2 changes according to the length of the ditch G between the portions R11A and R11B. Consequently, it is possible to determine whether or not the forklift 10 can move across the ditch G by setting the predetermined value based on the length of the ditch G across which the forklift 10 can move. In the case where the determination result in Step S33 is negative, the image processing section 41 turns off the low position determination flag in Step S7. On the other hand, in the case where the determination result in Step S33 is affirmative, the image processing section 41 turns on the low position determination flag in Step S14.

An advantage of the second embodiment will be described. The second embodiment has the following advantage in addition to the advantage (1-1) of the first embodiment.

(2-1) The image processing section 41 can determine that the low position is the ditch G by extracting the third line L3 in addition to the first line L1 and the second line L2.

The above-described embodiments may be modified as follows. The above-described embodiments and the following modifications can be combined as long as the combined modifications remain technically consistent with each other.

In each embodiment, when the first line L1 and the second line L2 are extracted and the difference between the slope of the first line L1 and the slope of the second line L2 falls within the permissible range, it may be determined that the low position is present. That is, it is not necessary to determine whether the low position is the second road surface R2 lower than the first road surface R1 or the ditch G, and determine whether or not the movement of the forklift 10 is allowed.

The determination of whether the low position is the second road surface R2 lower than the road surface R1 or the ditch G may be performed concurrently with the detection of the low position by combining the first embodiment and the second embodiment. Specifically, in the case where the determination result in Step S8 in the first embodiment is negative, it is determined whether or not the third line L3 is present. When the result of the determination of whether or not the third line L3 is present is affirmative, it may be determined that the low position is the ditch G. For example, in the case where the determination result in Step S8 is negative, it is conceivable to consider the determination result in Step S31 affirmative, and proceed to the next Step S32. With this, it is possible to detect the low position regardless of whether the low position is the second road surface R2 lower than the first road surface R1 or the ditch G.

Figure 13:
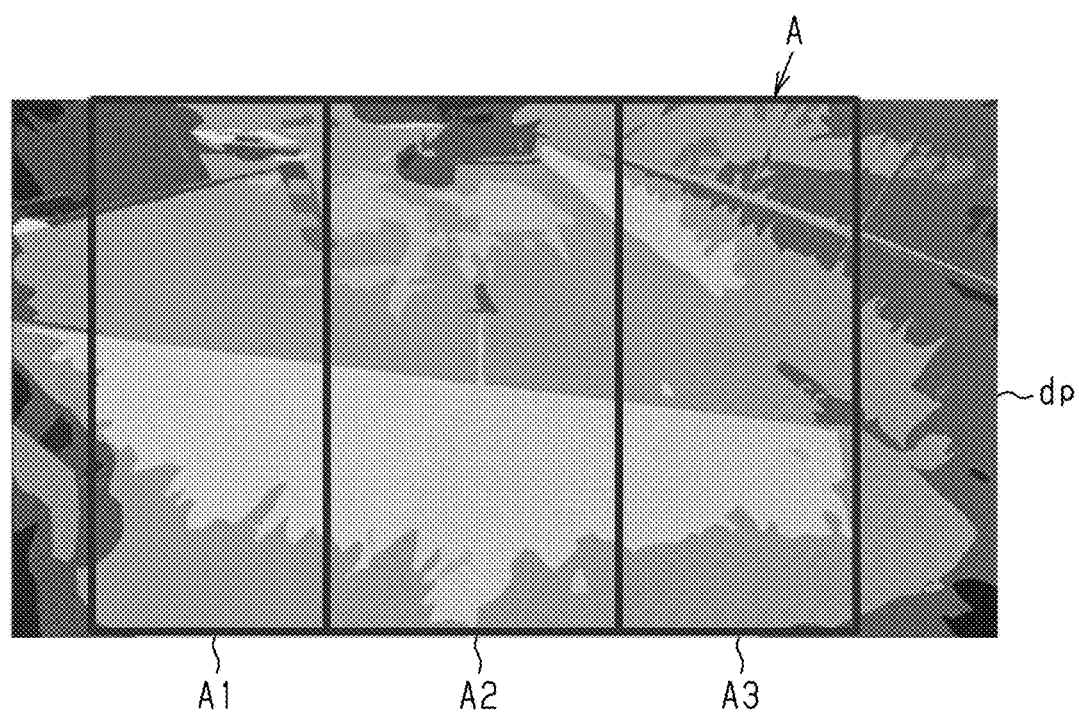
FIG. 13 is a diagram showing, as a modification of FIG. 5, a diagram in which an area is divided into a plurality of areas.

As shown in FIG. 13, the area A of the parallax image dp may be divided into a plurality of areas. In an example shown in FIG. 13, the area A is divided into three areas A1 to A3. The central area A2 of the three areas A1 to A3 is an area through which the forklift 10 passes in the case where the forklift 10 moves. The areas A1 and A3, which are areas among the three areas A1 to A3 and other than the central area are portions on the opposite sides of the area through which the forklift 10 passes in the case where the forklift 10 moves. In this state, different control operations may be performed depending on the area A1, A2, or A3. For example, the speed limitation is performed in the case where the low position is detected in the central area A2, and an alarm is issued to a person on board in the case where the low position is detected in the area A1 or A3 on the left or the right of the central area A2.

In the second embodiment, the image processing section 41 may estimate the depth of the ditch G. The image processing section 41 calculates the depth of the ditch G by using the Y-coordinate of the start point coordinates (x1, y1) of the third line L3, and the Y-coordinate of the end point coordinates (x3, y3) of the third line L3. Specifically, the image processing section 41 estimates the depth of the ditch G from the difference between the coordinate in real space corresponding to the Y-coordinate of the start point coordinates (x1, y1) of the third line L3, and the coordinate in real space corresponding to the Y-coordinate of the end point coordinates (x3, y3) of the third line L3.

In each embodiment, in addition to the detection of the low position, the image processing section 41 may detect an obstacle or a wall which hinders the travel of the forklift 10. The obstacle or the wall can be detected from the parallax.

In each embodiment, as the speed limitation of the forklift 10, fixed limitation may also be imposed irrespective of the distance from the forklift 10 to the step ST.

In each embodiment, the coordinate transform from the camera coordinate system into the world coordinate system may be performed by using table data instead of using Expression (4). The table data includes table data in which the Y-coordinate Yw is associated with the combination of the Y-coordinate Yc and the Z-coordinate Zc, and table data in which the Z-coordinate Zw is associated with the combination of the Y-coordinate Yc and the Z-coordinate Zc. By storing the table data sets in the ROM of the image processing section 41 and the like, it is possible to determine the Y-coordinate Yw and the Z-coordinate Zw in the world coordinate system from the Y-coordinate Yc and the Z-coordinate Zc in the camera coordinate system.

In each embodiment, when the distance from the forklift 10 to the low position is less than or equal to the limitation start distance, the issue of the alarm to a person on board may be performed instead of the speed limitation of the forklift 10, or both of the speed limitation and the issue of the alarm may also be performed. The alarm is issued by, e.g., using display by a display device which can be visually recognized by a person on board, or by using sound.

In each embodiment, the number of pixels of the first image may be different from the number of pixels of the second image. For example, the number of pixels of the second image serving as the comparison image may be equal to the number of pixels of the parallax image dp, and the number of pixels of the first image serving as the reference image may be greater than the number of pixels of the second image.

In each embodiment, the parallax image acquisition section, the voting section, the line extraction section, and the determination section may be individually constituted by separate control apparatuses.

In each embodiment, the first camera 32 and the second camera 33 may be disposed so as to be arranged in the vertical direction.

In each embodiment, the stereo camera 31 may include three or more cameras.

In each embodiment, the forklift 10 may be caused to travel by driving by an engine. In this case, the travel control apparatus controls a fuel injection amount to the engine and the like.

In each embodiment, the position detection apparatus 30 may also be mounted on movable bodies other than the forklift 10 such as an industrial vehicle and a passenger car including construction equipment, an automatic guided vehicle, and a truck.

In the position detection apparatus, when the parallax is calculated from the image captured by the stereo camera, the calculated parallax increases as a portion in the image approaches the stereo camera. The pixel in the vertical direction represents a distance from the stereo camera. Accordingly, when the road surface imaged by the stereo camera is a flat surface, the parallax gradually changes according to the pixel in the vertical direction, and hence the line extraction section extracts a single line. In contrast to this, in the case where the low position is present, the distance from the stereo camera to the low position increases correspondingly to the height difference between the road surface and the low position, which is lower than the road surface. With this, in the case where the road surface and the low position are present, at a pixel at which the road surface is changed to the low position, the parallax changes more significantly than in the case where the road surface is, e.g., flat. The parallax significantly changes and, as a result, the line extraction section extracts the first line and the second line. Consequently, by using the extraction of the first line and the second line, it is possible to detect that the low position is present without improving the infrastructure in the configuration described above.

In the position detection apparatus, the determination section is configured to determine that the low position is a flat surface formed due to a step in a case where (i) an intercept of the first line and an intercept of the second line are different from each other, and (ii) a difference between the X-coordinate of the end point coordinates of the first line and the X-coordinate of the start point coordinates of the second line is greater than or equal to a predetermined value.

In the position detection apparatus, the determination section is configured to determine that the low position is a ditch that is recessed from the road surface in a case where:

(vi) a difference between an intercept of the first line and an intercept of the second line falls within a permissible range, (vii) a third line, which extends from the end point coordinates of the first line and in which an X-coordinate decreases as a Y-coordinate increases is present, and (viii) a difference between an X-coordinate of end point coordinates of the third line and the X-coordinate of the start point coordinates of the second line is greater than or equal to a predetermined value.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A position detection apparatus that is mounted on a movable body and is configured to detect a low position that is a position lower than a road surface on which the movable body is present, the position detection apparatus comprising:
    a stereo camera;
    a parallax image acquisition section configured to acquire a parallax image in which a parallax is associated with each pixel from an image captured by the stereo camera;
    a voting section configured to vote the parallax associated with each pixel in the parallax image to a two-dimensional matrix of the parallax and a pixel in a vertical direction in the parallax image;
    a line extraction section configured to extract a line from a coordinate system in which the parallax having the number of votes by the voting section that is greater than or equal to a threshold value is plotted, and in which an X-axis indicates the parallax and a Y-axis indicates the pixel in the vertical direction; and
    a determination section configured such that, in a case where
        a first line and a second line are detected by the line extraction section,
        an X-coordinate of the start point coordinates of the second line is greater than an X-coordinate of end point coordinates of the first line, and
        a difference between a slope of the first line and a slope of the second line falls within a permissible range,
    the determination section determines that the low position is present at a position farther from the movable body than a position in real space that corresponds to a Y-coordinate of start point coordinates of the second line.

2. The position detection apparatus according to claim 1, wherein the determination section is configured to determine that the low position is a flat surface formed due to a step in a case where
    (i) an intercept of the first line and an intercept of the second line are different from each other, and
    (ii) a difference between the X-coordinate of the end point coordinates of the first line and the X-coordinate of the start point coordinates of the second line is greater than or equal to a predetermined value.

3. The position detection apparatus according to claim 1, wherein the determination section is configured to determine that the low position is a ditch that is recessed from the road surface in a case where:
    (vi) a difference between an intercept of the first line and an intercept of the second line falls within a permissible range,
    (vii) a third line, which extends from the end point coordinates of the first line and in which an X-coordinate decreases as a Y-coordinate increases is present, and
    (viii) a difference between an X-coordinate of end point coordinates of the third line and the X-coordinate of the start point coordinates of the second line is greater than or equal to a predetermined value.

4. A position detection method executed by a position detection apparatus mounted on a movable body, the position detection method comprising:
    capturing an image with a stereo camera;
    acquiring a parallax image in which a parallax is associated with each pixel from the image captured by the stereo camera;
    voting the parallax associated with each pixel in the parallax image to a two-dimensional matrix of the parallax and a pixel in a vertical direction in the parallax image;
    extracting a line from a coordinate system in which the parallax having the number of votes obtained by voting the parallax that is greater than or equal to a threshold value is plotted, and in which an X-axis indicates the parallax and a Y-axis indicates the pixel in the vertical direction;

detecting a first line and a second line by extracting the line, an X-coordinate of start point coordinates of the second line being greater than an X-coordinate of end point coordinates of the first line, a difference between a slope of the first line and a slope of the second line falling within a permissible range; and determining, in a case where the first line and the second line are detected, that a low position that is a position lower than a road surface on which the movable body is present is present at a position farther from the movable body than a position in real space corresponding to a Y-coordinate of the start point coordinates of the second line.

5. A non-transitory computer-readable storage medium storing a program for causing a processor mounted on a movable body to execute a position detection process, the position detection process comprising:

capturing an image with a stereo camera;

acquiring a parallax image in which a parallax is associated with each pixel from the image captured by the stereo camera;

voting the parallax associated with each pixel in the parallax image to a two-dimensional matrix of the parallax and a pixel in a vertical direction in the parallax image;

extracting a line from a coordinate system in which the parallax having the number of votes obtained by voting the parallax that is greater than or equal to a threshold value is plotted, and in which an X-axis indicates the parallax and a Y-axis indicates the pixel in the vertical direction;

detecting a first line and a second line by extracting the line, an X-coordinate of start point coordinates of the second line being greater than an X-coordinate of end point coordinates of the first line, a difference between a slope of the first line and a slope of the second line falling within a permissible range; and determining, in a case where the first line and the second line are detected, that a low position that is a position lower than a road surface on which the movable body is present is present at a position farther from the movable body than a position in real space corresponding to a Y-coordinate of the start point coordinates of the second line.

* * * * *